(No Model.)
J. W. BUTLER.
APPARATUS FOR MOLDING PERFORATED BLOCKS FOR CONTAINING ELECTRIC WIRES.
No. 352,504. Patented Nov. 9, 1886.
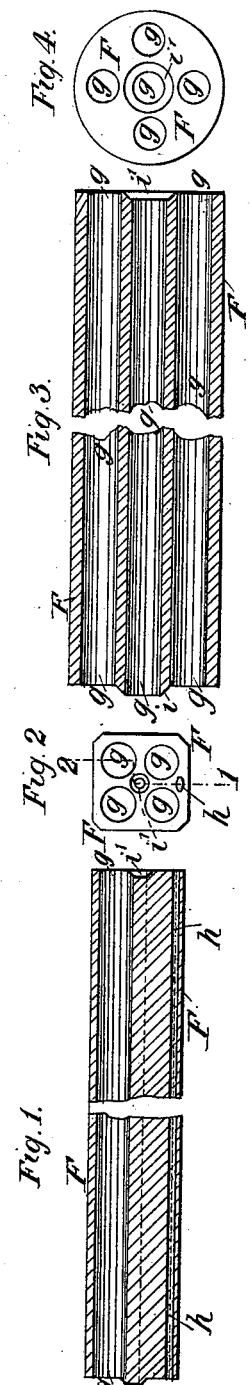
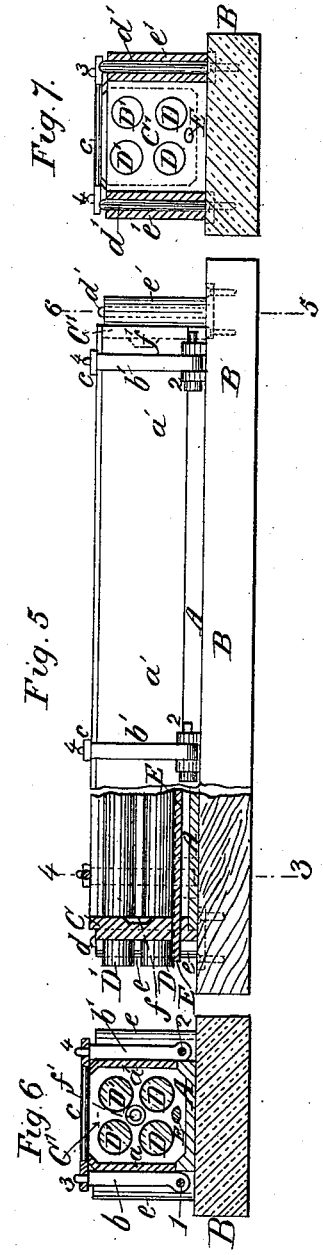
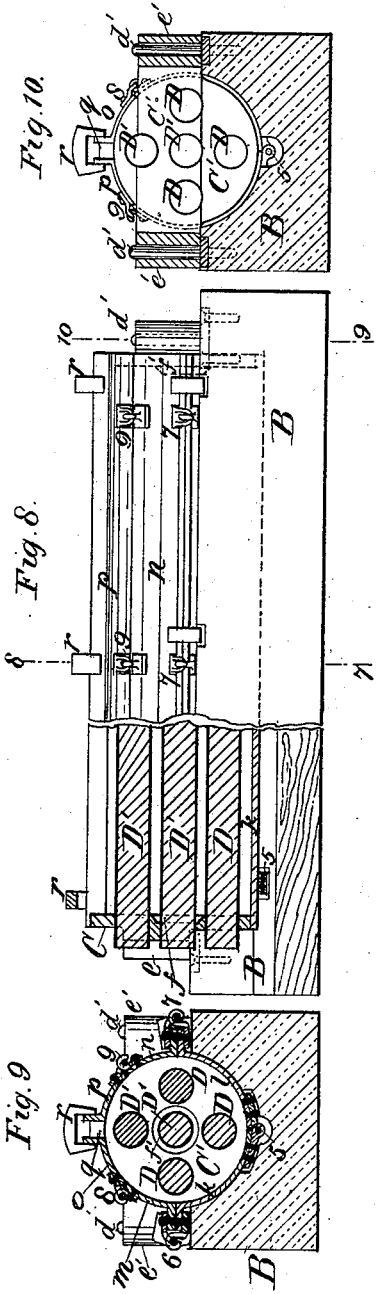
WITNESSES
INVENTOR

UNITED STATES PATENT OFFICE.

JAMES WILLIAM BUTLER, OF HUMBER ROAD, BLACKHEATH, COUNTY OF KENT, ENGLAND.

APPARATUS FOR MOLDING PERFORATED BLOCKS FOR CONTAINING ELECTRIC WIRES.

SPECIFICATION forming part of Letters Patent No. 352,504, dated November 9, 1886.

Application filed July 6, 1886. Serial No. 207,235. (No model.) Patented in England February 2, 1886, No. 1,538.

*To all whom it may concern:*

Be it known that I, JAMES WILLIAM BUTLER, a subject of the Queen of Great Britain and Ireland, and residing at Humber Road, Blackheath, in the county of Kent, England, have invented a new and useful Apparatus for Molding Perforated Blocks for Containing Electric Wires, (for which I have applied for Letters Patent in Great Britain, No. 1,538, February 2, 1886;) and I do hereby declare that the following is a full, clear, and exact description of the invention, which will enable others skilled in the art to which it appertains to make and use the same.

My invention relates to perforated blocks or receptacles of bituminous composition—such, for example, as that described in my application for a patent of even date herewith—for containing electric wires or cables, particularly when placed underground, and it has reference to a new and useful apparatus for molding or forming such blocks or receptacles, whereby they may be produced and laid with facility and dispatch.

In carrying out my invention the blocks are made horizontally of a considerable length, so as to reduce the number of joints, and with any required number of holes, in which the electric wires or cables are laid. Both the blocks and their internal holes may be of a square, circular, or other suitable section, according to circumstances and the exigencies of the purpose to which they are to be applied. Assuming that the blocks are to be made of a square section, I employ a mold or case of the required size internally for the outside of the blocks, consisting of a bottom, two hinged sides, and two ends, the top being, by preference, left uncovered. The ends of the mold are formed by plates having holes, through which the cores or mandrels for forming the perforations in the blocks are passed, the ends of the cores or mandrels being thus supported by these end plates. Each mandrel is inclosed in a sleeve of prepared bituminous cloth, or bituminous or other paper, which enables the mandrel to be withdrawn easily as soon as the block is formed. The end plates are each provided with a vertical socket capable of fitting over a corresponding pin carried by the base, to which the bottom of the mold is secured; or the converse of this arrangement may be adopted, the pins being carried by the end plates and the sockets by the base, so as to insure the vertical position of the ends of the mold.

In the operation of molding the perforated blocks the hinged sides of the mold are closed and rigidly secured by tie-bars having holes or pins fitting over or in corresponding pins or sockets carried by the hinged sides, and the end plates are placed in position. A portion of the bituminous composition is then introduced in a heated condition and tamped down with hot irons until the place for the lower-most mandrel or row of mandrels is reached, when they are introduced through the holes designed for them in one of the end plates, and passed along until their further extremities rest in the corresponding holes of the other end plate, the mandrels being thus supported at their opposite ends by the said end plates. A further quantity of the composition is then introduced and tamped down, as before, and another row of mandrels is inserted, and more of the composition is introduced and tamped down, and so on, in succession, until the top of the mold is reached, when the upper surface is smoothed off with any convenient instrument; or the mandrels may be placed in position first, and the composition then introduced and rammed down with hot irons beneath, between, and above the mandrels, until the mold is full, when the upper surface is smoothed off, as before. When the composition is sufficiently set, the mold containing the molded block is removed bodily from the base and may be immersed in cold water, after which the mandrels are withdrawn, (the sleeves of bituminous cloth or bituminous or other paper with which they are surrounded facilitating their withdrawal,) the end plates are removed, and the hinged sides turned down, and the perforated block is liberated from the mold. The blocks may be connected together by butt-joints, slight depressions and corresponding projections being made on the opposite ends of the block, so as to insure the proper alignment of the holes through which the cables are to pass. These depressions and projections may be conveniently made by means of corresponding projections and depressions provided on and in the end plates of the mold. An efficient junction is obtained by sealing the engaging projections and depressions of the blocks with a molten preparation of the same composition; but, if necessary, I may employ, in addition, short sockets of the same composition, slightly larger in their internal diameter or dimensions than the external diameter or dimensions of the blocks, one of which sockets is placed over the ends of each two contiguous blocks and the junction sealed with a molten preparation of the same composition, whereby a perfectly continuous block will be obtained. In some cases longitudinal iron or steel rods or T-irons may be inserted in the mold, so as to be embedded in the material or composition, this arrangement being particularly suitable where great lengths and extra strength are required. When it is required to produce perforated blocks of a circular cross-section, the mold or case is made of a corresponding cross-section and in sectional parts hinged together, so that it may be built up as the ramming in of the material or composition proceeds, until the top is nearly reached, a narrow space being left for ramming in the last portion between the free ends of the first and last sections, which are held together by clips at intervals. The arrangement is otherwise similar to that of the mold or case for square blocks, hereinbefore described.

And, in order that the said invention may be perfectly understood, I shall now proceed more particularly to describe the same, and for that purpose shall refer to the several figures on the accompanying sheet of drawings, the same letters of reference indicating corresponding parts in all the figures.

Figures 1 and 2 of the accompanying drawings illustrate a block of a square section having four holes of a circular section, Fig. 1 being a longitudinal section taken along the line 1 2, Fig. 2, and Fig. 2 an end elevation of the same. Figs. 3 and 4 illustrate a block of a circular section having five holes, Fig. 3 being a central longitudinal section, and Fig. 4 an end view of the same. Figs. 5, 6, and 7 represent the mold or case for manufacturing the block, Figs. 1 and 2, Fig. 5 being a longitudinal sectional elevation, and Figs. 6 and 7 transverse vertical sections, taken respectively along the lines 3 4 and 5 6, Fig. 5. Figs. 8, 9, and 10 represent the mold or case for manufacturing the block, Figs. 3 and 4, Fig. 8 being a longitudinal sectional elevation, and Figs. 9 and 10 transverse vertical sections, taken respectively along the lines 7 8 and 9 10, Fig. 8.

Referring to Figs. 5, 6, and 7, the mold or case consists of the bottom A, (carried on the base B,) the sides $a\ a'$, hinged at 1 2 to the bottom, and the end plates, C C'. The hinges $b\ b'$ of the sides $a\ a'$ are provided with pins 3 4, respectively, with which engage holes in the tie-bars $c$. To the base A are secured vertical pins $d\ d'$, with which engage sockets $e\ e'$, carried by the end plates, C C'. D D' are the cores or mandrels, covered with sleeves of prepared bituminous cloth, or bituminous or other paper, as before mentioned. They are supported in holes in the end plates, C C', and are introduced, first, the mandrels D and then the mandrels D', as the ramming in and tamping of the composition proceeds; or the whole of the mandrels may be first inserted and the composition then rammed in and tamped, as before explained. The small core E is provided to form a longitudinal space for the reception of any water which may accumulate beneath the blocks when laid in the ground, and which is thus prevented from rising into the holes for the wires or cables. $f$ shows a depression in the end plate C, and $f'$ a projection on the end plate C', for forming engaging projections and depressions on and in the blocks for insuring the proper alignment of the holes through which the wires or cables pass.

The perforated block formed by the mold, Figs. 5, 6, and 7, is represented in Figs. 1 and 2, F being the body of the block, $g$ the holes for the wires or cables, $h$ the safety water-space, $i$ the projection on one end, and $i'$ the depression in the other end, of the block.

Referring to Figs. 8, 9, and 10, the mold or case is composed of any required number of sections or divisions, $k\ l\ m\ n\ o\ p$, the consecutive sections being hinged or jointed together at 5, 6, 7, 8, and 9, respectively, and the upper ones, $m\ n\ o\ p$, built up as the operation of ramming in and tamping proceeds. The narrow space $q$ is left between the free ends of the sections $o\ p$ for the ramming in of the last portion, the sections $o\ p$ being held together by clips $r$, arranged at intervals along the length of the mold. A small mandrel may be added, if required, to form a safety water-space in the block, as shown in Figs. 5, 6, and 7, and the arrangement is otherwise similar to that of those figures and requires no further description.

Figs. 3 and 4 represent the perforated block formed by the mold, Figs. 8, 9, and 10.

It is obvious that the sectional form of the blocks and the number and sectional form of the holes may be varied according to circumstances, the shape of the mold and number and shape of the cores or mandrels being modified accordingly.

Short junction-sockets, as before described, may, if desired, be used in addition to the engaging projections and depressions $i\ i'$, which are sealed, as before explained, and the blocks may be strengthened, where necessary, by the addition of longitudinal iron or steel rods or T-irons, inserted in the molds before the material or composition is introduced, so as to be embedded in the same.

I do not broadly claim horizontally molding or forming perforated blocks or receptacles of bituminous composition, so as to admit of their being constructed of considerable length without joints; but, Having fully described my invention, what I desire to claim, and secure by Letters Patent, is—

In an apparatus for molding or forming horizontally-perforated blocks or receptacles of bituminous composition for containing electric wires or cables, the horizontal molds or cases formed of jointed sections, and end plates carrying cores or mandrels covered with sleeves of prepared bituminous cloth, or bituminous or other paper, substantially as herein set forth.

In testimony whereof I have signed my name to this specification in the presence of two subscribing witnesses.

JAMES WILLIAM BUTLER.

Witnesses:
 THOMAS JOHN HANDFORD,
 ALFRED JOHN MAXWELL,
  *Both of* 50 *Bedford Row, London.*